United States Patent [19]
Hasebe et al.

[11] Patent Number: 5,220,416
[45] Date of Patent: Jun. 15, 1993

[54] COLOR IMAGE PROCESSING APPARATUS

[75] Inventors: Takashi Hasebe; Seiichiro Hiratsuka; Tadao Kishimoto; Tetsuya Niitsuma; Koji Washio; Hiroshi Tokunaga; Yukio Okamoto, all of Tokyo, Japan

[73] Assignee: Konica Corporation, Tokyo, Japan

[21] Appl. No.: 598,223

[22] Filed: Oct. 16, 1990

[30] Foreign Application Priority Data

Oct. 19, 1989 [JP] Japan ................ 1-272468
Oct. 19, 1989 [JP] Japan ................ 1-272469

[51] Int. Cl.$^5$ ............................................. H04N 1/46
[52] U.S. Cl. ................................. 358/75; 355/80
[58] Field of Search .......................... 358/75, 79, 80

[56] References Cited

U.S. PATENT DOCUMENTS

| | | | |
|---|---|---|---|
| 4,631,578 | 12/1986 | Sasaki et al. | 358/80 |
| 4,895,208 | 1/1990 | Moriya et al. | 358/75 |
| 4,953,013 | 8/1990 | Tsuji et al. | 358/75 |
| 5,075,787 | 12/1991 | Shaughnessy et al. | 358/448 |

FOREIGN PATENT DOCUMENTS

| | | |
|---|---|---|
| 0290887A3 | 4/1988 | European Pat. Off. . |
| 0290887A2 | 11/1988 | European Pat. Off. . |
| 0371389A2 | 11/1989 | European Pat. Off. . |
| 038887A2 | 3/1990 | European Pat. Off. . |
| 0388887A3 | 3/1990 | European Pat. Off. . |
| 3-191677A | 8/1991 | Japan . |

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

A color image processing apparatus wherein a document image is divided into three colors and converted the color separated images into density data that correspond to a recording color by a color reproducing device. The color reproducing device has matrix coefficients for a plurality of linear maskings, a linear masking is selected out of the plurality of linear maskings by the three color separation signals, the linear masking is carried out using the masking coefficients of the selected linear masking, and the color separated images are converted into density data that correspond to the recording color.

8 Claims, 19 Drawing Sheets

|  | SCANNER SYSTEM ||| PRINTER SYSTEM |||
|--|---|---|---|---|---|---|
|  | R | G | B | M/A C | M/A M | M/A Y |
| RED | 136 | 48 | 33 | 0 | 0.71 | 0.79 |
| GREEN | 30 | 61 | 52 | 0.71 | 0 | 1.07 |
| BLUE | 30 | 29 | 57 | 0.72 | 0.70 | 0 |
| CYAN | 32 | 84 | 147 | 0 | 0 | 0.87 |
| MAGENTA | 143 | 50 | 72 | 0 | 0.85 | 0 |
| YELLOW | 220 | 194 | 86 | 0.70 | 0 | 0 |
| BLACK | 24 | 24 | 24 | 0.70 | 0.75 | 0.81 |

FIG. 5

| M/A | 0 | 0.2 | 0.4 | 0.6 | 0.8 | 1.2 |
|---|---|---|---|---|---|---|
| Dr OF C | 0 | 0.331 | 0.548 | 0.790 | 0.969 | 1.165 |
| Dg OF M | 0 | 0.292 | 0.451 | 0.592 | 0.680 | 0.811 |
| Db OF Y | 0 | 0.217 | 0.320 | 0.410 | 0.456 | 0.530 |

| M/A | 0 | 0.16 | 0.3 | 0.5 | 0.8 | 1.3 |
|---|---|---|---|---|---|---|
| D OF BK | 0 | 0.2 | 0.4 | 0.6 | 0.8 | 1.0 |

FIG. 6

$$\text{REGION I} \quad a_{ij}(I) \begin{pmatrix} 1.3623 & -0.4336 & -0.0655 \\ -0.4606 & 1.3121 & -0.2059 \\ 0.2127 & -1.1619 & 1.3989 \end{pmatrix} \text{RED-MAGENTA}$$

$$\text{REGION II} \quad a_{ij}(II) \begin{pmatrix} 1.4696 & -0.2312 & -0.3752 \\ -0.5047 & 1.2290 & -0.0786 \\ 0.1974 & -1.1908 & 1.4432 \end{pmatrix} \text{MAGENTA-BLUE}$$

$$\text{REGION III} \quad a_{ij}(III) \begin{pmatrix} 0.9124 & 0.3043 & -0.3536 \\ -0.8283 & 1.6135 & -0.1395 \\ 0.3351 & -1.3515 & 1.4662 \end{pmatrix} \text{BLUE-CYAN}$$

$$\text{REGION IV} \quad a_{ij}(IV) \begin{pmatrix} 1.1499 & -0.3408 & 0.0541 \\ -1.1530 & 2.4952 & -0.6965 \\ 0.3942 & -1.5119 & 1.5675 \end{pmatrix} \text{CYAN-GREEN}$$

$$\text{REGION V} \quad a_{ij}(V) \begin{pmatrix} 1.1860 & -0.2164 & -0.1066 \\ -1.2187 & 2.2694 & -0.4052 \\ 0.4650 & -1.2687 & 1.2532 \end{pmatrix} \text{GREEN-YELLOW}$$

$$\text{REGION VI} \quad a_{ij}(VI) \begin{pmatrix} 1.3571 & -0.4139 & -0.0801 \\ -0.4916 & 1.4298 & -0.2926 \\ 0.1428 & -0.8965 & 1.2034 \end{pmatrix} \text{YELLOW-RED}$$

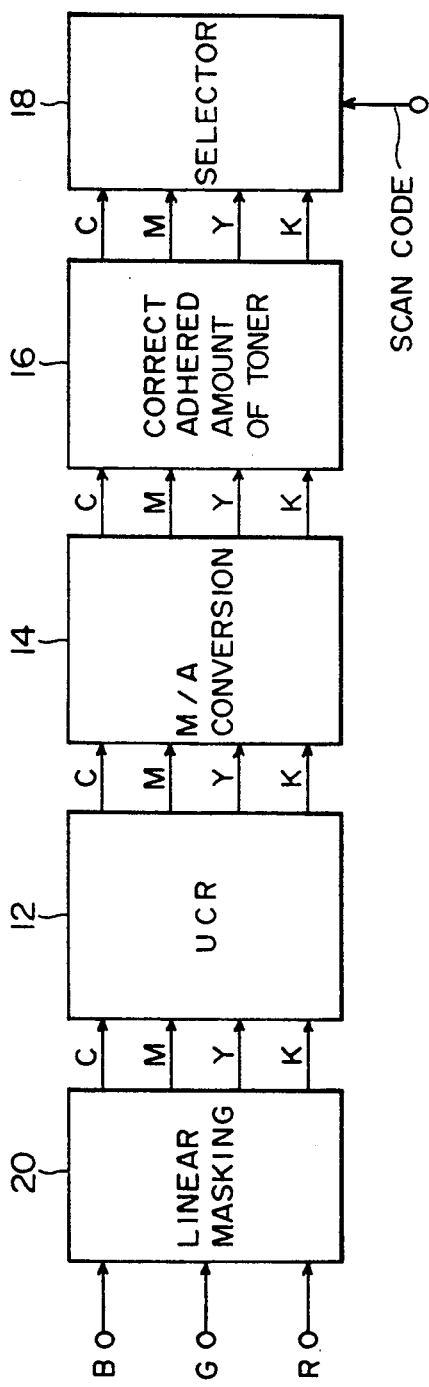
F I G . 9
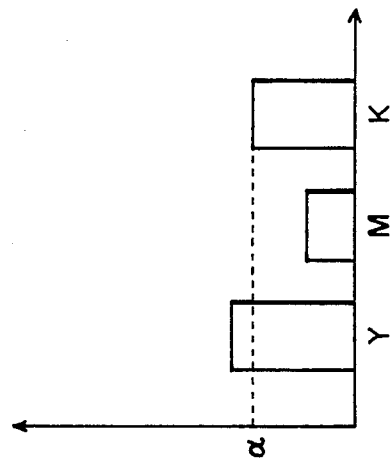
F I G . 10 (B)
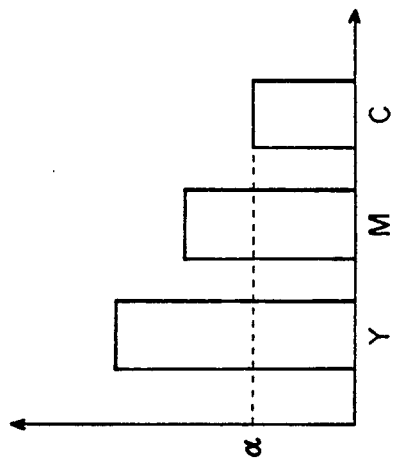
F I G . 10 (A)

FIG. 16

| COLOR CODE / MARKER REGION / SCAN CODE | WHITE 00 | CHROMATIC COLOR 10 | BLACK 11 | |
|---|---|---|---|---|
| | | | WITHIN THE REGION 1 | OUTSIDE THE REGION 0 |
| Y | O | O | D | O |
| M | O | O | D | O |
| C | O | O | D | O |
| K | O | O | O | D |

FIG. 17

| MARKER REGION / SCAN CODE | WITHIN THE REGION 1 | OUTSIDE THE REGION 0 | INVERTED / TINTED MODE |
|---|---|---|---|
| Y | Dv/Do | O | O |
| M | Dv/Do | O | O |
| C | Dv/Do | O | O |
| K | O | D | D |

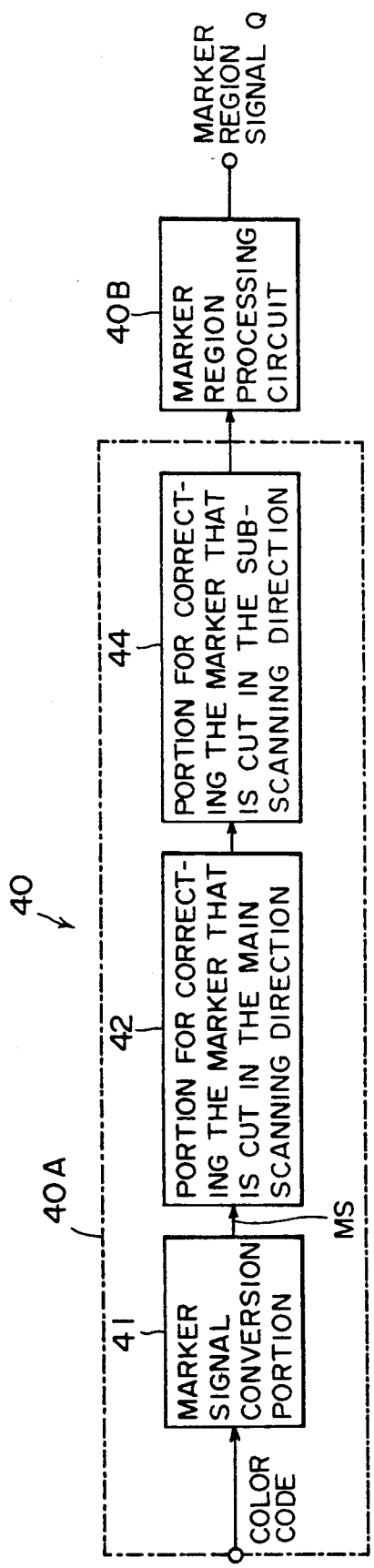

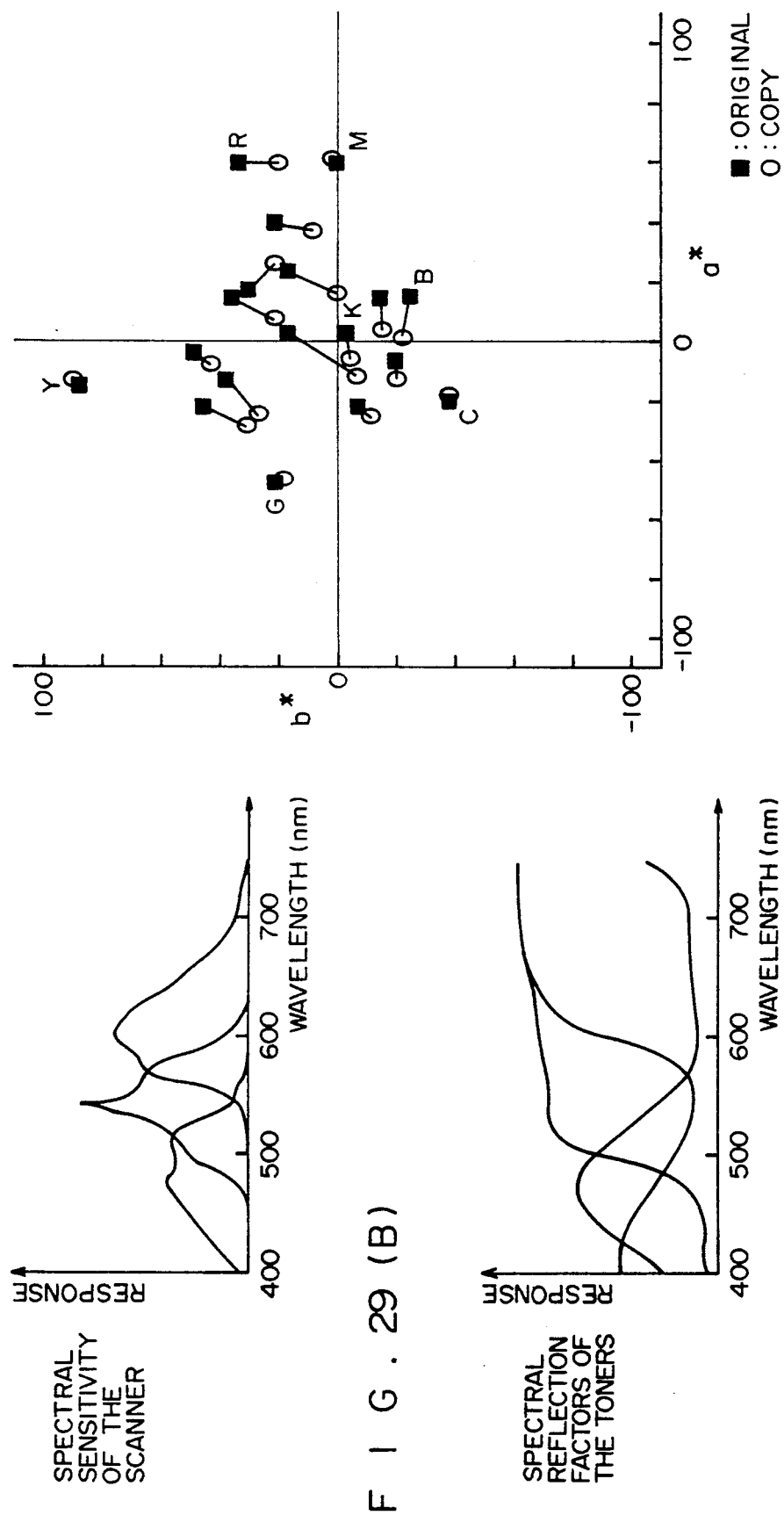

COLOR IMAGE PROCESSING APPARATUS

BACKGROUND OF THE INVENTION

1. Field of the Invention

The present invention relates to a color image processing apparatus that can be suitably adapted to a full color reproducing apparatus and like apparatus, in order to improve color reproduceability while preventing the quality of the recorded image from being deteriorated by the density shading of markers entered in a document.

2. Description of the Prior Art

There has been proposed a color image processing apparatus in which color images such as character image, photograph image and like images are optically read and divided into red R, green G and blue B, and are converted into recording colors such as yellow Y, magenta M, cyan C and black K, which are then recorded onto a recording paper using an output apparatus such as an electrophotographic color image reproducing machine.

There has further been proposed a color image processing apparatus of this type but which has a marker color conversion function to convert a portion surrounded by a marker into a color same as the marker among black characters on a black-and-white document.

With such color image processing apparatuses, the image data of input document are usually converted into signals of R, G and B. However, the recording colors of the printer unit are C, M, Y and K which are complementary colors thereof.

In this case, the spectral sensitivity characteristics of a scanner and the spectral reflection factor of a toner differ from each other as shown in FIGS. 29(A) and 29(B). Therefore, the density levels of R, G and B found based upon the scanner level can be converted into density levels of C, M and Y toners by the linear masking method.

Here, the linear masking is expressed by the following equation, $$\begin{pmatrix} Dc \\ Dm \\ Dy \end{pmatrix} = \begin{pmatrix} a11 & a12 & a13 \\ a21 & a22 & a23 \\ a31 & a32 & a33 \end{pmatrix} \cdot \begin{pmatrix} Dr \\ Dg \\ Db \end{pmatrix} \quad (1)$$

Dr, Dg, Db—R, G, B brightness levels of the scanner that are converted into density levels,
Dc, Dm, Dy—C, M, Y toner adhesion amounts that are converted into density levels,
aij (i, j=1, 2, 3)—matrix coefficient.

As will be obvious from the L*a*b* isochromatic coordinate system of FIG. 30, the R, G and B (original colors) are in nearly perfect agreement with C, M, and Y after recorded (copy). In regard to other colors, however, conversion error becomes conspicuous since the linear masking method is an approximation.

Therefore, if the masking coefficient is calculated using three colors R, G and B, the color reproduceability is deteriorated in the printer system.

In a marker color conversion circuit used for such a color image processing apparatus, furthermore, the region of a marker MC and its color entered in the document, as shown in FIG. 27, are read for each scanning line to determine the region and the marker color for each scanning line. In FIG. 27, dots "." represent sampling points for determining the marker color.

When the marker color conversion function is utilized, on the other hand, it is often attempted to change the recording density of image included in a region surrounded by the marker MC depending upon the density of the marker. In such a case, however, a change in the density of the marker MC turns out to be shading in the recording density to deteriorate the quality of recording.

Further, when a certain region is surrounded by the marker MC as shown in FIG. 28, the upper half of the marker being, for example, red and the lower half thereof being blue, the upper half of the image in the region surrounded by the marker is recorded in red which is the same color as the marker color and the lower half is recorded in blue.

In this case, it is better to record the image in the same color as the initial color of the marker MC for better visibility.

SUMMARY OF THE INVENTION

The object of the present invention is to solve such assignments.

Another object of the present invention is to provide a color image processing apparatus which can improve color reproduceability so that the quality of a recorded image will not be deteriorated by the density shading of a marker and that an image will not be recorded in plural colors.

In order to solve the above-mentioned first assignment, the present invention deals with a color image processing apparatus which comprises:

image reading means which separates a document image into three colors to read the image as color separated images; and color reproducing means which converts the color separated images read by the image reading means into density data that correspond to a recording color;

wherein the color reproducing means has matrix coefficients for a plurality of linear maskings, a linear masking is selected out of the plurality of linear maskings by the three color separation signals, the linear masking is carried out using the masking coefficients of the selected linear masking, and the color separated images are converted into density data that correspond to a recording color.

In the color image processing apparatus of the present invention, the color-space region is divided into a plurality of regions on the coordinate system of R, G, B, C, M, Y and BK. Since the center axis is BK (black), the color-space region is divided into a total of six regions (FIG. 3).

By using the linear masking method, masking coefficients aij(I) to aij(VI) are calculated for the divided regions I to VI. Then, as shown in FIG. 7, at least R, G, B, C, M, Y and BK can be converted without error. Even in other regions, the conversion error becomes small since the divided regions for calculating the masking coefficients have small areas.

It is discriminated in which divided region the input R, G and B signals are included, and the masking coefficient in that region is selected as a masking coefficient at that moment.

In order to solve the aforementioned second assignment, the present invention deals with a color image processing apparatus which comprises:

image reading means which separates a document image into three colors to read the image as color separated images;

color code forming means for forming color codes that indicate to which one of white color/achromatic color/chromatic color the pixels of the color separated images read by the image reading means pertain;

color reproducing means which converts the color separated images read by the image reading means into density data that correspond to a recording color;

marker region detecting means which detects a marker portion on the document image based on the color codes from the color code forming means, and picks up a region surrounded by the marker portion; and marker color conversion means which converts the density data at a sampling point on a particular line in the marker region and the marker color at a sampling point into density data and marker color in the whole marker region.

The color image processing apparatus of the present invention samples a particular point on a particular scanning line in the region of the marker MC, and detects density data and a marker color at the sampling point.

The density data and marker color are propagated through the whole region surrounded by the marker, and are used as the density data and marker color of the marker MC.

Therefore, the image in the region surrounded by the marker MC has the density that corresponds to the density data, and the recording color becomes the same as the marker color at the sampling point.

Other objects and features of the color image processing apparatus according to the present invention will be described below in conjunction with the drawings.

BRIEF DESCRIPTION OF THE DRAWINGS

FIG. 3 is a diagram showing a relationship between the L*a*b* coordinate system and the division of region;

FIGS. 4 to 6 and 8 are diagrams for explaining the masking coefficients;

FIG. 9 is a system diagram of a color reproduction processing circuit;

FIGS. 10(A), 10(B), and 11(A) to 11(C) are diagrams for explaining the color reproduction processing circuit;

FIGS. 16 and 17 are diagrams explaining the marker color conversion circuit;

FIG. 18 is a system diagram of a region detecting portion;

FIG. 19 is a diagram explaining the region detecting portion;

FIGS. 29(A) and 29(B) are diagrams showing spectral characteristics of the scanner and spectral reflection factor of the toner; and FIG. 30 is a diagram showing the L*a*b* coordinate.

DESCRIPTION OF THE PREFERRED EMBODIMENTS

An example of a color image processing apparatus according to the present invention will now be described in detail in conjunction with the drawings.

Figure 1:
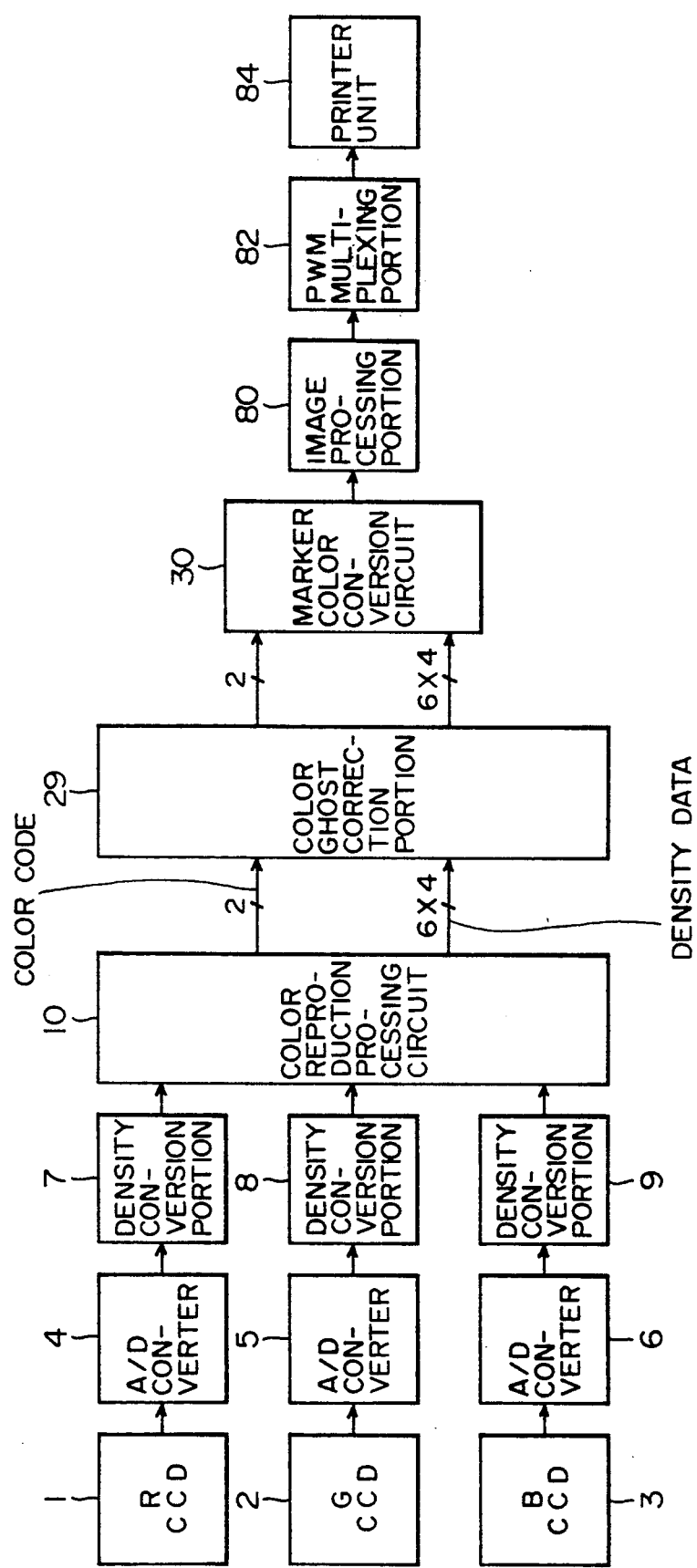
FIG. 1 is a diagram illustrating the constitution of a color image processing apparatus according to an embodiment of the present invention.

First, the color image processing apparatus of the invention will be briefly described in conjunction with a block diagram of FIG. 1.

In FIG. 1, reference numeral 1 denotes an R-CCD which converts red document image into image signals, 2 denotes a G-CCD which converts green document image into image signals, and 3 denotes a B-CCD which converts blue document image into image signals.

Therefore, the image data (optical image) of the document is separated into R, G and B by a dichroic mirror (not shown) which are then focused on the corresponding CCDs 1, 2 and 3.

Reference numeral 4 denotes an A/D converter which converts a red image signal read by the R-CCD 1 into digital data consisting of eight bits, 5 denotes an A/D converter which converts a green image signal read by the G-CCD 2 into digital data consisting of eight bits, and 6 denotes an A/D converter which converts a blue image signal read by the B-CCD 3 into digital data consisting of eight bits.

At the time when the A/D conversion is carried out, the shading is also corrected based on image data of a reference white plate.

Reference numeral 7 denotes a density conversion portion which converts red digital data consisting of eight bits into digital data consisting of six bits, 8 denotes a density conversion portion which converts green digital data consisting of eight bits into digital data consisting of six bits, and 9 denotes a density conversion portion which converts blue digital data consisting of eight bits into digital data consisting of six bits.

Reference numeral 10 denotes a color reproduction processing circuit which processes the color codes (two-bit codes indicating that each pixel is any one of white/black/chromatic color, e.g., white:00, black:11, chromatic color:10) and which reproduces colors (R, G, B yellow Y, magenta M, cyan C, black K).

The color reproduction processing circuit 10 produces two-bit color codes as well as Y, W, C, K density signals each consisting of six bits.

Reference numeral 29 denotes a color ghost correction portion which corrects color ghost. Undesired color ghost generates around black characters.

The color ghost is corrected by detecting whether it is a color ghost using a 1×7 window. Then, the color code of a pixel in which the color ghost is detected is converted into a color code of a correct color. The color ghost is corrected in the direction of main scanning and in the direction of sub-scanning.

The color ghost correction portion 29 can be realized by utilizing technology disclosed, for example, in Japanese Patent Laid-Open No. 195775/1989.

Reference numeral 30 denotes a marker color conversion circuit which detects the marker region on the document and converts the region into the marker color, and produces a density signal D of the marker color and a marker region signal Q.

Reference numeral 80 denotes an image processing portion which subjects the density signals to various image processings such as filtering, change of magnification, tinting, etc., 82 denotes a PWM multiplexing portion which multiplexes the density signal of six bits through pulse width modulation (PWM), and reference numeral 84 denotes a printer unit which forms color image by superposing toner images of the Y, M, C and K colors on a photosensitive drum (OPC).

Each of the portions will now be described in detail.

Figure 2:
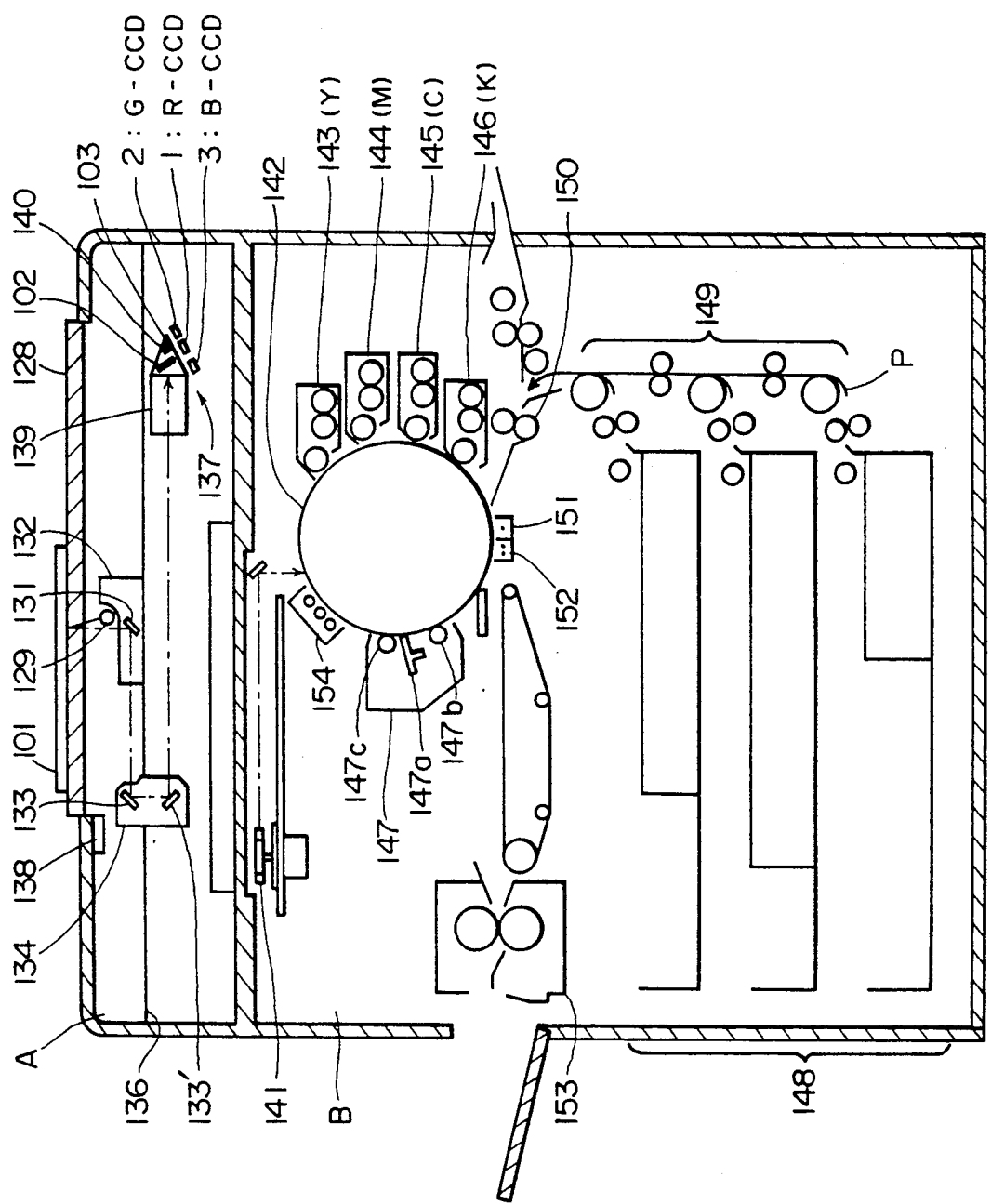
FIG. 2 is a diagram illustrating the whole constitution of a reproducing machine.

First, described below in conjunction with FIG. 2 are the whole constitution and operation of the reproducing machine to which the color image processing apparatus of the present invention is adapted.

Here, the description deals with the case where the reproducing machine is based on the color dry-type developing system. In this case, use is made of two-component non-contact developing and reversal developing system. That is, the transfer drum that is used in the conventional color image formation is not used, and the images are superposed on an electrophotographic photosensitive drum to form image.

In order to reduce the size of the apparatus, furthermore, images of four colors, i.e., yellow Y, magenta M, cyan C and black K are developed on the OP photosensitive drum that forms image by turning the drum four times and after the developing, transfer operation is effected only one time to transfer the image onto the recording paper such as an ordinary paper or a like paper.

A document reading unit A is energized when a copy button (not shown) in the operation portion of the reproducing machine is turned on. Then, a document 101 on a document glass plate 128 is optically scanned by an optical system.

The optical system is constituted by a carriage 132 equipped with a reflection mirror 131 and a light source 129 such as a halogen lamp or the like, and a moving mirror unit 134 equipped with V-mirrors 133 and 133'.

The carriage 132 and the moving mirror unit 134 are driven by stepping motors (not shown) to run on a slide rail 136 at predetermined speeds and in predetermined directions, respectively.

Optical data (image data) obtained by irradiating the document 101 using the light source 129 are guided to an optical data conversion unit 137 via reflection mirror 131 and V-mirrors 133, 133'.

A standard white plate 138 is provided on the back surface at the left end of the document glass plate 128 to normalize the image signals to white signals by optically scanning the standard white plate 138.

The optical data conversion unit 137 is constituted by a lens 139, a prism 140, two dichroic mirrors 102 and 103, R-CCD 1 for imaging red color separated image, G-CCD 2 for imaging green color separated image, and B-CCD 3 for imaging blue color separated image.

The optical signal obtained by the optical system is focused by the lens 139, and is separated into blue color optical data and yellow optical data through the dichroic mirror 102 provided in the prism 140. Further, the yellow optical data is separated into red color optical data and green color optical data through the dichroic mirror 103. Thus, the color optical image is separated into optical data of three colors, i.e., red R, green G and blue B through the prism 140.

The individual color separated images are focused on the light-receiving surfaces of the CCDs and are converted into electric signals to obtain image signals. The image signals are subjected to the aforementioned signal processings through the signal processing system, and recording image signals of each of the colors are sent to a writing unit B.

The writing unit B (printer unit 84) has a deflector 141 which may consist of a galvanomirror, a rotary polygon mirror, or a light deflector using a quartz. The laser beam modulated by the color signals is put to the deflected scanning by the deflector 141.

As the deflected scanning is started, the beam scanning is detected by a laser beam index sensor (not shown), and the beam modulation is started by the first color signal (e.g., yellow signal). The modulated beam scans an image retainer (photosensitive drum) 142 to which electric charge has been uniformly imparted by a charging device 154.

Here, an electrostatic latent image corresponding to the first color signal is formed on the image retainer 142 due to the main scanning by the laser beam and due to the sub-scanning by the turn of the image retainer 142.

The electrostatic latent image is developed by a developing device 143 that contains a yellow toner to form a yellow toner image. Here, the developing device has been applied with a predetermined developing bias voltage from a source of high voltage.

The toner is supplied to the developing device, i.e., the toner is supplied whenever it is required by toner feeding means (not shown) which is controlled by an instruction signal from a CPU (not shown) for the system controller.

The above-mentioned yellow toner image is turned under the condition where a cleaning blade 147a is no more press-contacted, and an electrostatic latent image is formed based on a second color signal (e.g., magenta signal) like in the case of the first color signal. Using a developing device 144 which contains a magenta toner, the electrostatic latent image is developed to form a magenta image.

It needs not be pointed out that a predetermined developing bias voltage is applied to the developing device 144 from the source of high voltage.

Similarly, an electrostatic latent image is formed based on a third color signal (cyan signal) and a cyan toner image is formed by a developing device 145 that contains a cyan toner. Further, an electrostatic latent image is formed based on a fourth color signal (black signal) and is developed in the same manner as in the previous times by a developing device 146 which contains a black toner.

Therefore, toner images of many colors are formed superposed on the image retainer 142.

In the foregoing was described the formation of a multi-color toner image of four colors. It is, however, also allowable to form a two-color toner image or a monocolor toner image.

The processing of developing described above was a so-called non-contact two-component jumping developing in which the developing was carried out while permitting the toners to fly toward the image retainer 142 under the condition where AC and DC bias voltages were applied from the source of high voltage.

The toners are supplied to the developing devices 143, 144, 145 and 146 in predetermined amounts based upon the instruction signals from the CPU in a manner as mentioned above.

A recording paper P fed from a paper feeding device 148 via a feeding roller 149 and a timing roller 150 is carried onto the surface of the image retainer 142 in synchronism with the turn of the image retainer 142. The multicolor toner image is transferred onto the recording paper P by a transfer electrode 151 to which a high voltage is applied from the source of high voltage, and the recording paper P is separated by a separating electrode 152.

The separated recording paper P is carried to a fixing device 153 where the fixing processing is carried out to obtain a color image.

The image retainer 142 after the completion of transfer is cleaned up by a cleaning device 147 and waits for the next image-forming process.

In the cleaning device 147, a predetermined DC voltage is applied to a metal roll 147b so that the toner cleaned by the cleaning blade 147a can be easily recovered. The metal roll 147b is disposed without contacting to the surface of the image retainer 142. After the cleaning operation, the cleaning blade 147a is released from the press-contacted condition. In order to remove undesired toner that is left at the moment when the cleaning blade 147a is released from the press-contacted condition, furthermore, there is provided an auxiliary roller 147c which is rotated in a direction opposite to the image retainer 142 and is press-contacted thereto, so that undesired toner is cleaned up and is removed to a sufficient degree.

Reverting to FIG. 1, the color reproduction processing circuit 10 forms a two-bit color code and 6-bit Y, M, C and K density signals.

That is, depending upon the levels of data R, G and B, a two-bit color code (e.g., white:00, black:11, chromatic color:10, see FIG. 19) is formed to indicate to which color region of white/black/chromatic color the pixel pertains. Described below is a process for forming the color codes.

1. Formation of white code

First, R, G and B are converted into an XYZ coordinate system according to the following equation, $$\begin{pmatrix} X \\ Y \\ Z \end{pmatrix} = \begin{pmatrix} 0.0658 & 0.0838 & 0.1812 \\ 0.3279 & 0.6158 & -0.0027 \\ -0.0087 & -0.3369 & 1.4888 \end{pmatrix} \cdot \begin{pmatrix} R \\ G \\ B \end{pmatrix} \quad (2)$$

The XYZ coordinate system is then converted into an L*a*b* isochromatic color space according to the following equations, $$L^* = 116(Y/Y_O)^{\frac{1}{3}} - 16 \quad (3)$$

$$a^* = 500[(X/X_O)^{\frac{1}{3}} - (Y/Y_O)^{\frac{1}{3}}] \quad (4)$$

$$b^* = 200\{[(Y/Y_O)^{\frac{1}{3}} - (Z/Z_O)^{\frac{1}{3}}]\} \quad (5)$$

where,
$Y_O = 100$,
$X_O = 98.07$,
$Z_O = 118.23$

The area where $L^* \geq 90$ is regarded to be white region in the thus obtained isochromatic color space L*a*b*.

2. Formation of achromatic color (black) code

First, a parameter Q is found from the signals R, G and B in accordance with the following equation, $$Q = \sqrt{\{(R - W_O)^2 + (G - W_O)^2 + (B - W_O)^2\}/(W \cdot W_O)} \quad (6)$$

Thus, the parameter Q is found, and the area of $Q \leq 15$ is regarded to be black region.

3. Formation of chromatic color code

A chromatic color code is set with the areas other than the white region and black region as chromatic color regions.

In the color reproduction processing circuit 10, the processing for converting R, G and B into Y, M, C and K is carried out by a look-up table LUT constituted by ROM, in order to form 6-bit Y, M, C and K density data. Since the spectral photosensitive characteristics of the scanner and the spectral reflection factor of the toner are different as shown in FIG. 29, the density levels of R, G and B found based on the scanner level are converted into the density levels of C, M and Y toners by the linear masking method (see equation (1)).

According to the present invention, the masking coefficient is calculated as described below.

Figures 3, 4:
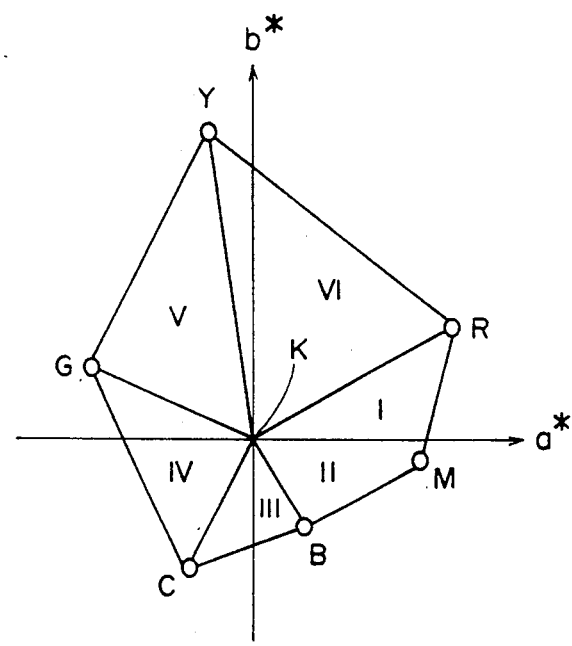

That is, the region is divided into I to VI as shown in FIG. 3 using R, G, B, C, M, Y and K(BK) plotted on the L*a*b* isochromatic coordinate system.

Next, in compliance with the above equation, a masking coefficient aij used in the region is calculated using colors (three colors) at vertexes of each divided region. For instance, the region I is constituted by R, BK and M, and from which a masking coefficient aij(I) is calculated. Described below are examples of calculation.

The brightness levels of R, G and B obtained by the scanner system are converted into the density levels using the following equations, $$Dr = -(64/1.5)\log_{10}\{(R+0.5)/256\} \quad (8)$$

$$Dg = -(64/1.5)\log_{10}\{(G+0.5)/256\} \quad (9)$$

$$Db = -(64/1.5)\log_{10}\{(B+0.5)/256\} \quad (10)$$

C, M and Y are converted into the density levels from the adhered amounts of toners by making reference to a curve (not shown) of density vs. adhered amount of toner of single color.

FIG. 4 shows the R, G and B scan levels (brightness levels) and C, M and Y toner adhered amounts (M/A) that are measured and are used for calculating the masking coefficients by using seven colors R, G, B, C, M, Y and BK.

That is, when the color of the left side is to be expressed, the brightness levels become as shown in the scanner systems (R, G, B) and the toner adhesion amount M/A becomes as shown in the printer systems (C, M, Y).

FIG. 5 shows a relationship between the toner adhesion amounts M/A and the density levels Dr, Dg, Db.

From the relationships of FIGS. 4 and 5 and from the equations (8) to (10), the masking coefficients aij(I) to aij(VI) are calculated by the method of least squares so that R, G and B come in agreement with C, M and Y. FIG. 6 shows examples of masking coefficients in the regions I to VI which are thus calculated.

According to the above, at least seven colors R, G, B, Y, M, C and BK come into perfect agreement even after the conversion. As for the colors in each of the divided regions, even a conversion error does not become so conspicuous since the divided regions have small areas.

Figure 7:
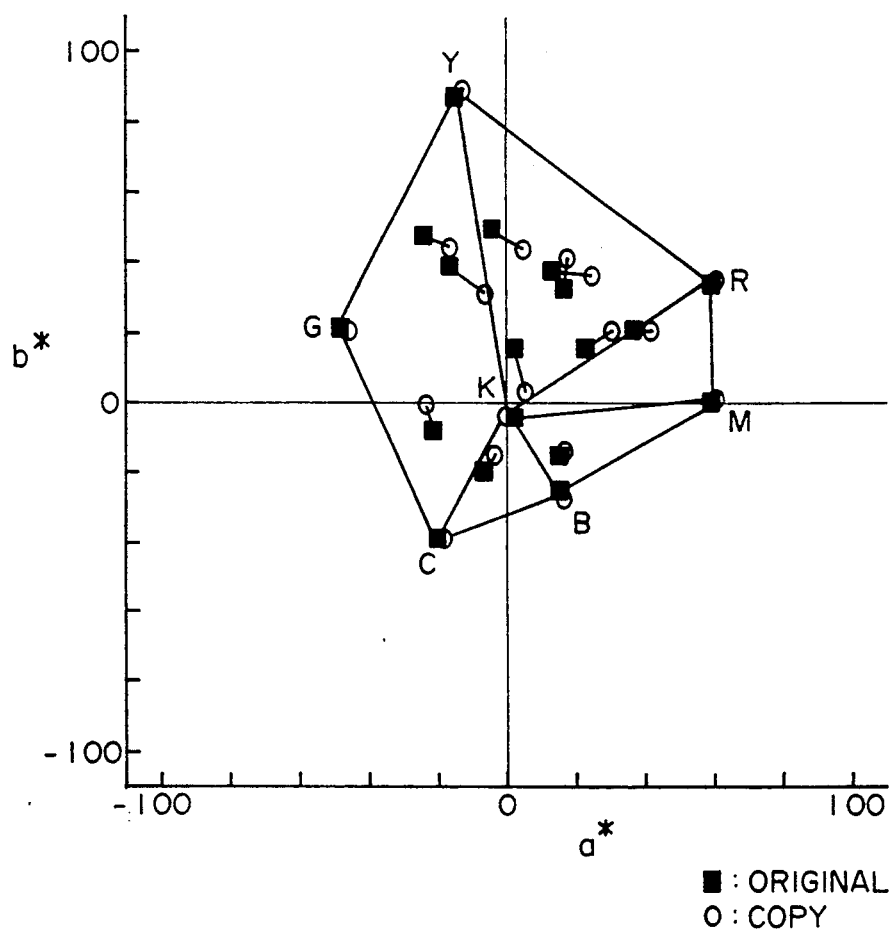
FIG. 7 is a diagram illustrating an L*a*b* coordinate system.

Therefore, if the masking coefficients are calculated by the region dividing system, the conversion errors become so small as shown in FIG. 7 that the color reproduceability is improved.

When the masking coefficients are calculated by dividing the region as described above, a problem arises in regard to discreteness at the boundaries of the regions. This problem will be analyzed below.

Though the description refers to the boundary between the regions I and II, the same holds true even for other boundaries.

First, an equation is found on a plane of the boundary and is substituted for the linear masking of the regions I, II. When the two are equal to each other, the values are all equal on the boundary surface proving the continuity of the converted color on the boundary surface.

Figure 8:
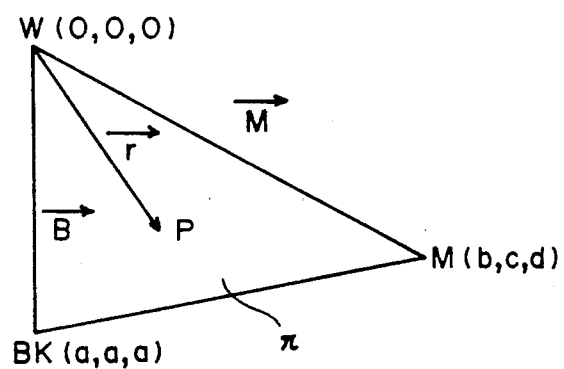

Here, the boundary surface between the regions I and II is a plane that passes through three points, i.e., white (W), M, and BK(K) as shown in FIGS. 3 and 8. A given point p on the plane has a vector r from the origin. Therefore, a plane equation of r is expressed as, $$r = \alpha B + \alpha M$$

If this is expressed by the magnitude (density level), the equation becomes as follows:

$$(Dr, Dg, Db) = \alpha(a, a, a) + \alpha(b, c, d) \quad (11)$$

where $\alpha$ and $\beta$ are any real numbers.

If values shown in FIGS. 6 to 8 are substituted as a, b, c and d, then, there are obtained, $$Dr = 1.028\alpha + 0.2538\beta$$

$$Dg = 1.028\alpha + 0.709\beta$$

$$Db = 1.028\alpha + 0.5518 \quad (12)$$

If they are substituted for the masking matrix of the region I, there is obtained, $$\begin{pmatrix} C \\ M \\ Y \end{pmatrix} = \begin{pmatrix} 1.3623 & -0.4336 & -0.06551 \\ -0.4606 & 1.3121 & -0.20591 \\ 0.2127 & -1.1619 & 1.39891 \end{pmatrix} \begin{pmatrix} 1.028\alpha + 0.253\beta \\ 1.028\alpha + 0.709\beta \\ 1.028\alpha + 0.551\beta \end{pmatrix} \quad (13)$$

$$= \begin{pmatrix} 0.889 & 0.001 \\ 1.665 & 0.700 \\ 0.463 & 0.001 \end{pmatrix} \begin{pmatrix} \alpha \\ \beta \end{pmatrix}$$

Further, if they are substituted for the masking matrix of the region II, there is obtained.

$$\begin{pmatrix} C \\ M \\ Y \end{pmatrix} = \begin{pmatrix} 1.4696 & -0.2312 & -0.37521 \\ -0.5047 & 1.2290 & -0.07891 \\ -0.1974 & -1.1908 & 1.44321 \end{pmatrix} \begin{pmatrix} 1.028\alpha + 0.253\beta \\ 1.028\alpha + 0.709\beta \\ 1.028\alpha + 0.551\beta \end{pmatrix} \quad (14)$$

$$= \begin{pmatrix} 0.889 & 0.001 \\ 0.665 & 0.700 \\ 0.463 & 0.001 \end{pmatrix} \begin{pmatrix} \alpha \\ \beta \end{pmatrix}$$

Thus, the value by the masking coefficient aij(I) of I is in complete agreement with the value by the masking coefficient aij(II) of 11 on the boundary surface $\pi$, and no discreteness of converted color develops on the boundary surface $\pi$.

FIG. 9 shows a concrete example of the aforementioned color reproduction processing circuit 10.

The R, G and B signals (brightness levels) are subjected to the aforementioned density conversion processing through linear masking means 20 and are converted into C, M, Y and K. The color K is independently provided so as to be used when a black-and-white document is to be copied.

The converted colors C, M, Y and K are then passed through undercolor removing means (UCR) 12 where undercolors are removed therefrom.

FIGS. 10(A) and 10(B) illustrate the 100% UCR. In this embodiment, cyan C which is a minimum density is used as a reference, and C, M and Y are removed by amounts corresponding to the density and are substituted by black K.

After the undercolor is removed, the density level is converted into toner adhesion amount M/A by toner adhesion amount conversion means 14 and is then corrected by toner adhesion amount correction means 16.

Figure 11A:
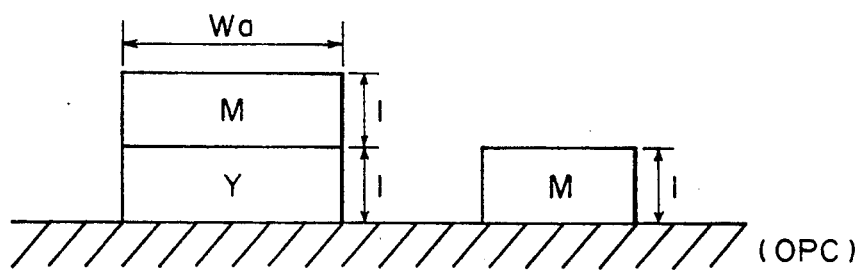
Figure 11B:
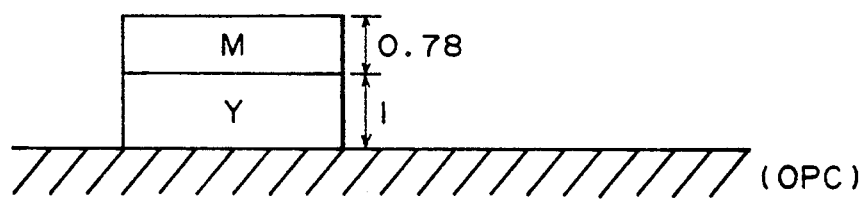
Figure 11C:
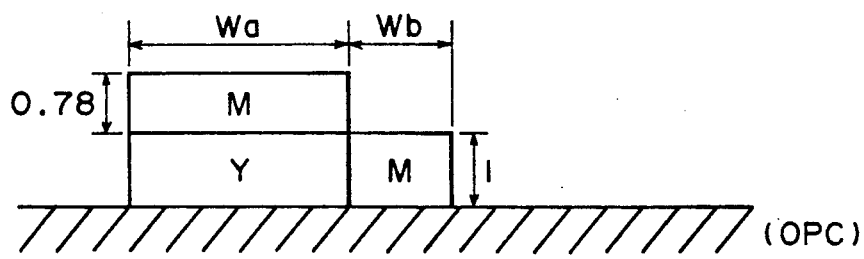

Referring to FIGS. 11(A) to 11(C), when, for example, Y and M are written being superposed with a write pulse width Wa by the printer unit 84, it is desired that the toners of Y and M are adhered in the same amount (FIG. 11(A)). In practice, however, the toner of M is adhered in an amount of about 78% compared with the case of the single color.

As shown in FIG. 11(C), therefore, the pulse width for writing M is widened by Wb than that of Y, so that the toner of M is adhered in an amount equal to that of the case of the single color.

This makes it possible to correct variation in the amount of toner adhered to the photosensitive drum (OPC).

A selector 18 selects C, M, Y and K whose toner adhesion amounts are corrected, and outputs them. This is because, since the printer unit 84 scans each color and develops the image in a superposed manner, the colors C, M, Y and K must be output in synchronism with the scanned color.

Therefore, a two-bit scan code is supplied to the selector 18.

Figure 12:
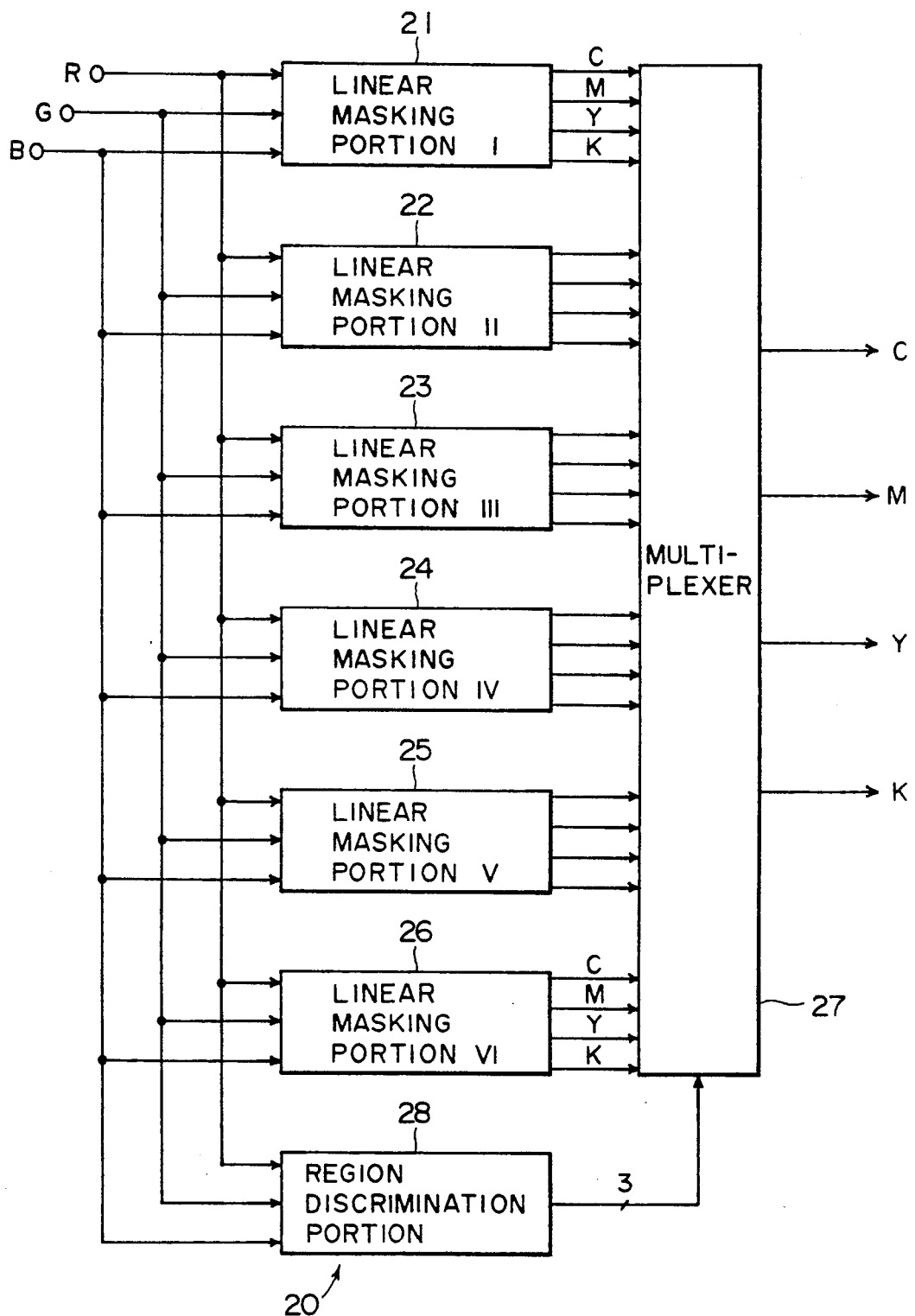
FIG. 12 is a system diagram of a linear masking circuit.

FIG. 12 shows an example of the linear masking means 20.

When the region is divided into six as shown in FIG. 3, there are provided linear masking portions 21 to 26 storing six masking coefficients aij(I) to aij(VI), and the colors C, M, Y and K output from them are selected by a multiplexer 27.

Therefore, the input R, G and B signals are supplied to a region discrimination portion 28 which discriminates to which region the input R, G and B signals pertain, and the linear masking portions 21 to 26 are selected depending on the discrimination output.

The linear masking circuit 20 may be constituted by a ROM table.

The region discrimination portion 28 can be constituted as described below.

Figure 13:
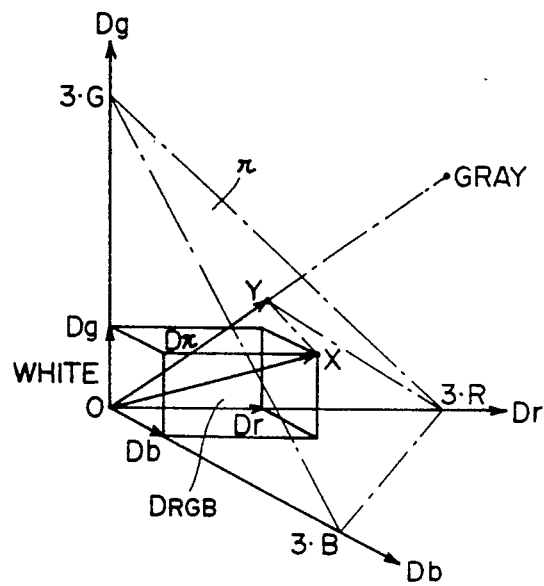
FIGS. 13(A) and 13(B) are diagrams for explaining the linear masking circuit.
Figure 13:
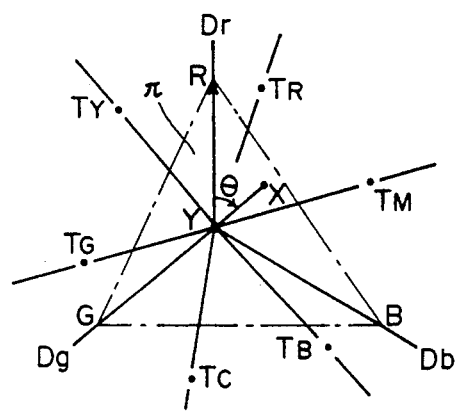

FIG. 13(A) is a rectangular coordinate of Dr, Dg and Db. If now the density signals on the scanner side are denoted by Dr, Dg and Db, they are expressed as $D_{RGB} \rightarrow (\overrightarrow{OX})$ in the coordinate.

Next, the plane x includes a point X and meets the vecto $\overrightarrow{OY}$ that represents an achromatic color at right angles therewith. Here, if the achromatic color has vector components r, g and b, then, $$r = g = b = k \, 1 \tag{15}$$

Therefore, $$\overrightarrow{OY} = (k, k, k) \tag{16}$$

where k is a real number,

When Y exists on a plane, $\pi$, a condition $$\overrightarrow{OY} \cdot \overrightarrow{YX} \tag{17}$$

$$\overrightarrow{OY} \cdot \overrightarrow{YX} = 0 \tag{18}$$

If calculated using the components, $$\overrightarrow{OY} \cdot (\overrightarrow{OX} - \overrightarrow{OY}) = 0$$

$$(k, k, k) \cdot (Dr, Dg, Db) - (k, k, k) = 0$$

$$(k, k, k) \cdot (Dr - k, Dg - k, Db - k) = 0$$

$$k\{Dr + Dg + Db - 3k\} = 0 \tag{19}$$

Since $k \neq 0$, $$k = (Dr + Dg + Db)/3 \tag{20}$$

That is, $$R = G = B = (Dr + Dg + Db)/3 \tag{21}$$

FIG. 13(B) shows the case when the plane $\pi$ at this moment is viewed from an extension of $\overrightarrow{OY}$.

R, G, B, X and Y all exist on the plane $\pi$. Here, when the angle of $\overrightarrow{YR}$ is 0° with Y as a center, the angle $\theta$ of $\overrightarrow{YX}$ is expressed as:

i)
$$\text{when } Dg > Db, \, \theta = \cos^{-1}(\overrightarrow{YR} \cdot \overrightarrow{YX}/\cdot\overrightarrow{YR}\cdot\cdot\overrightarrow{YX}\cdot) \tag{22}$$

ii)
$$\text{when } Dg < Db, \, \theta = \pi - \cos^{-1}(\overrightarrow{YR} \cdot \overrightarrow{YX}/\cdot\overrightarrow{YR}\cdot\cdot\overrightarrow{YX}\cdot) \tag{23}$$

Here, the angles <RYTM, <RYTB, —corresponding to toner images of C, M, Y, R, G and B are found in advance, and the six regions I to VI are divided by angles. Then, the angle 0 is found from the input signals R, G and B, and the magnitude of the angle is found in order to discriminate the six regions I to VI.

The marker color conversion is the processing which converts a portion surrounded by the marker into the same color as the marker among the black characters on the document.

Figure 14:
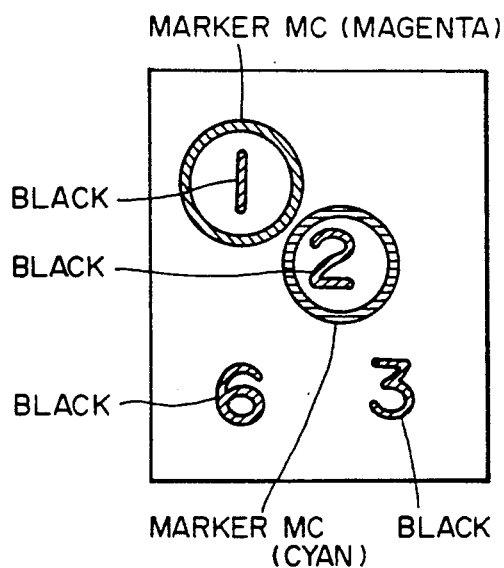
FIGS. 14(A) and 14(B) are diagrams explaining the marker conversion processing.
Figure 14:
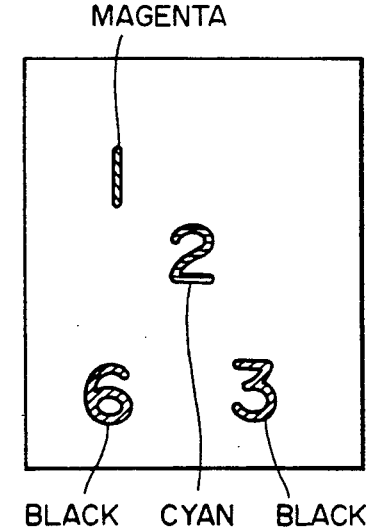

FIGS. 14(A) and 14(B) are diagrams for explaining the marker color conversion, wherein FIG. 14(A) shows a document of before being subjected to the marker color conversion, and FIG. 14(B) shows the recorded results after the marker color conversion. As shown in these drawings, among the black characters, those surrounded by color markers are formed in the same colors as the marker colors. There is no particular limitation in regard to the colors of the markers MC to be used.

Figure 15:
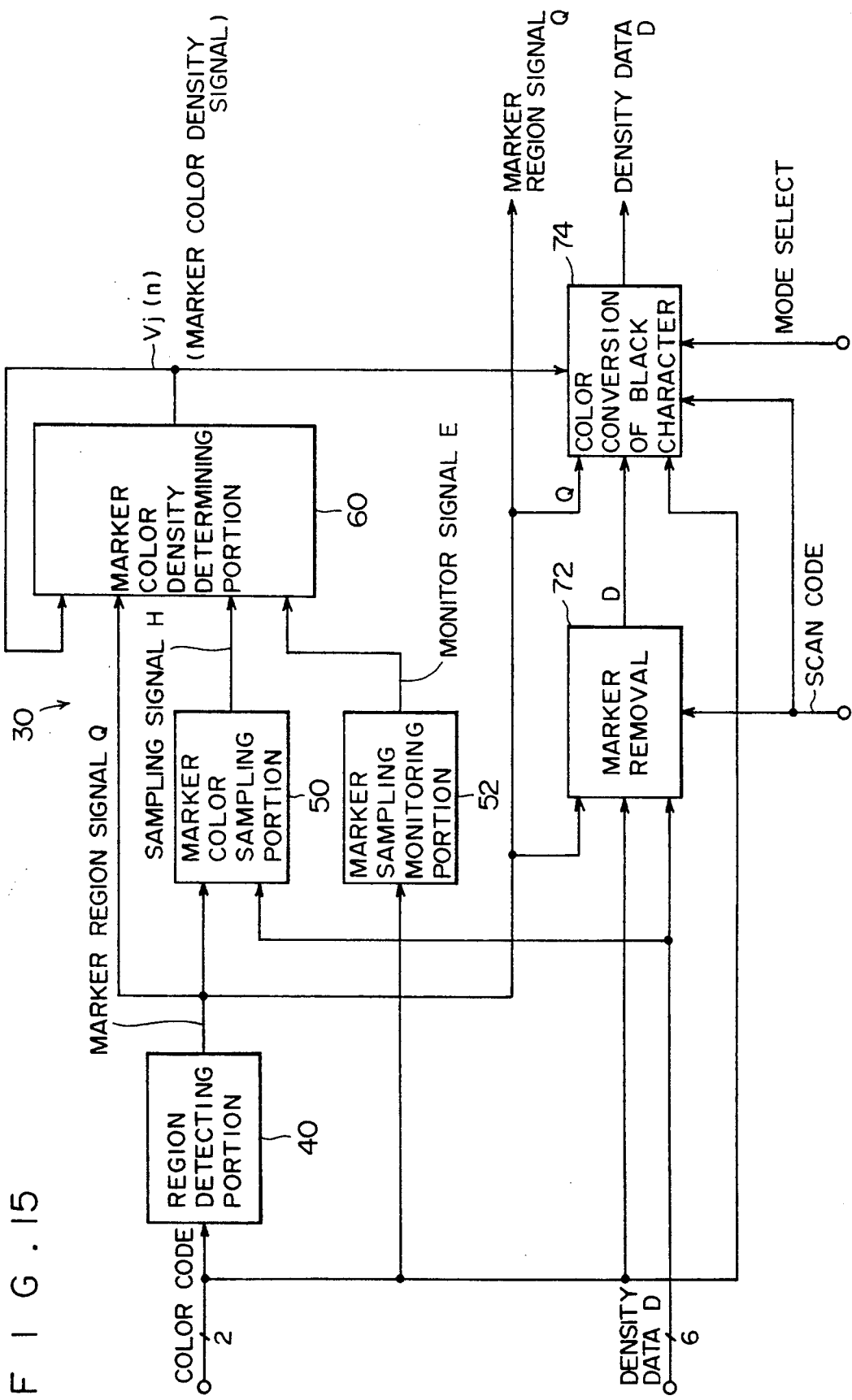
FIG. 15 is a system diagram of a marker color conversion circuit.

The marker color conversion circuit 30 is constituted as shown in FIG. 15.

In FIG. 15, reference numeral 40 denotes a region detecting portion which detects the color marker and picks up the region surrounded by the marker MC to form a marker region signal Q, and 50 denotes a marker color sampling portion which samples the density data of marker color (any one of C, M, Y or K) of when the marker region signal Q is obtained to obtain a sampling signal (density data) H.

Reference numeral 60 denotes a marker color density determining portion which determines whether the sampling signal H that is sampled be directly used as the density data of the marker MC. Therefore, the marker region signal Q, the sampling signal H, and a monitor signal E that will be described below, are supplied thereto.

Reference numeral 52 denotes a marker sampling monitoring portion which monitors the validity of the sampling of the marker MC based on the color code, and produces the monitor signal E.

Reference numeral 72 denotes a marker removal circuit which so works that the marker MC will not be recorded. A scan code is supplied thereto in addition to the color code, density data D, and marker region signal Q.

When black K is recorded by the printer unit 84, the marker removal circuit 72 permits black K data that is input to pass through. When Y, M, C and K are recorded, the marker removal circuit 72 permits the passage of black data only in the marker region.

Therefore, the values of the truth table become as shown in FIG. 16.

Reference numeral 74 denotes a black character color conversion circuit which effects the multiplication within the marker region only, and permits the black data to pass through in other regions.

A two-bit scan code is supplied thereto in addition to a marker color density signal V that will be described later, the density data D, the color code and the marker region signal Q. The density data D of black image surrounded by the marker MC is converted into the marker color and is output.

That is, as shown in FIG. 17, the output density data is obtained by multiplying the input density data D by a coefficient $V/D_0$ ($D_0$ is any constant).

Next, each of the portions of the marker color conversion circuit 30 will be described in detail.

FIG. 18 shows an example of the region detecting portion 40 which is constituted by a marker cut correction circuit 40A and a marker region processing circuit40B.

The marker cut correction circuit 40A corrects the blur or cut in the marker in the main scanning direction and the sub-scanning direction. First, the color code is converted into a marker signal MS through a marker signal conversion portion 41.

The marker signal MS is obtained when the color code has a chromatic color. FIG. 19 shows relationships between the color codes and the marker signals MS.

The marker signal MS is supplied to a portion 42 for correcting the marker that is cut in the main scanning direction.

Figure 20:
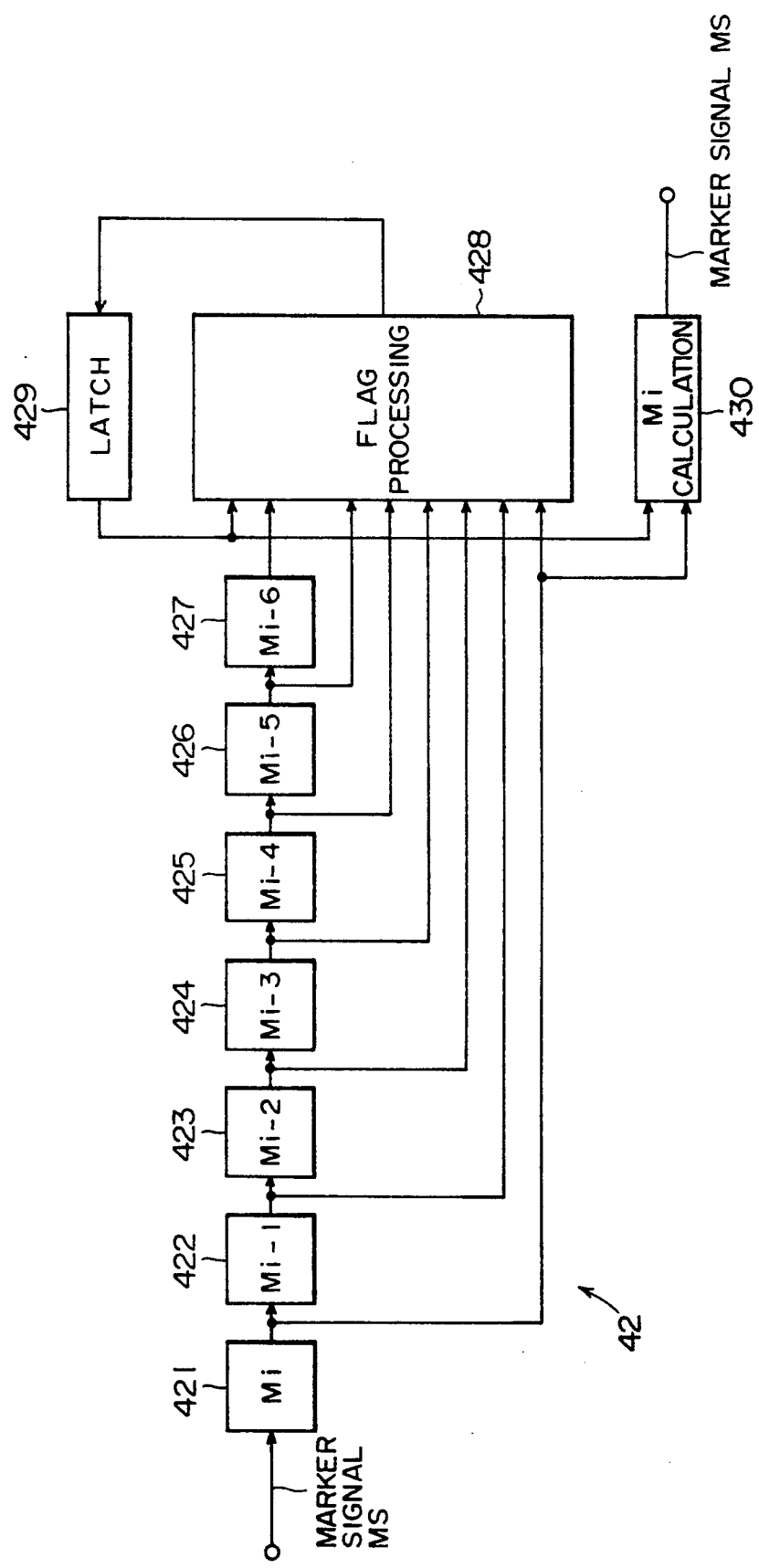
FIG. 20 is a system diagram of a portion for correcting the marker cut in the direction of main scanning.

FIG. 20 concretely illustrates the marker cut correction portion 42 in which seven delay elements 421 to 427 each for one pixel are connected in this embodiment in cascade, the outputs thereof being supplied to a flag processing portion 428. When the inputs are all "1", a marker continuous flag becomes "1" which is then latched by a latch circuit 429.

The marker continuous flag is supplied to the flag processing portion 428 and to an output marker signal calculation portion 430 which receives an output Mi of the delay element 421 of the initial stage. The marker signal calculation portion 430 consists of an OR circuit which is logically designed so that the output marker signal MS necessarily becomes "1" whenever the marker continuous flag or the marker signal Mi is "1".

This makes it possible to correct marker cut of at least seven pixels in the main scanning direction.

After the marker cut is corrected in the main scanning direction, a marker cut correction portion 44 of the next stage corrects the marker that is cut in the sub-scanning direction through the same processing as the one described above. In this embodiment, the marker cut of at least seven lines is corrected.

The marker region processing circuit 40B forms a marker region signal Q corresponding to a region surrounded by the marker signal MS. This will be described in conjunction with FIGS. 21 and 22.

Figure 21:
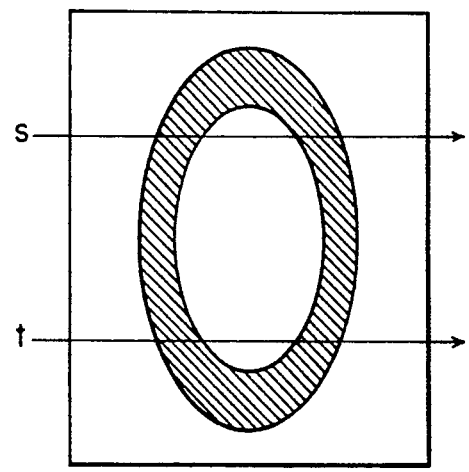
FIGS. 21 and 22 are diagrams explaining the marker region signals.

The marker signal obtained by scanning like s becomes as shown in FIG. 21. It is further presumed that a region signal obtained by a just preceding scan s−1 (not shown in FIG. 21) is represented by Qs−1 in FIG. 22. Here, an AND signal Qs−1×MS is obtained, and an edge detect pulse Rs is formed from the rising edge to the breaking edge of Qs−1×MS. Then, an OR signal Qs of the marker signal MS and the edge detect pulse Rs is formed. The signal Qs is used as a marker region signal Q for the present scanning line s.

Figure 22:
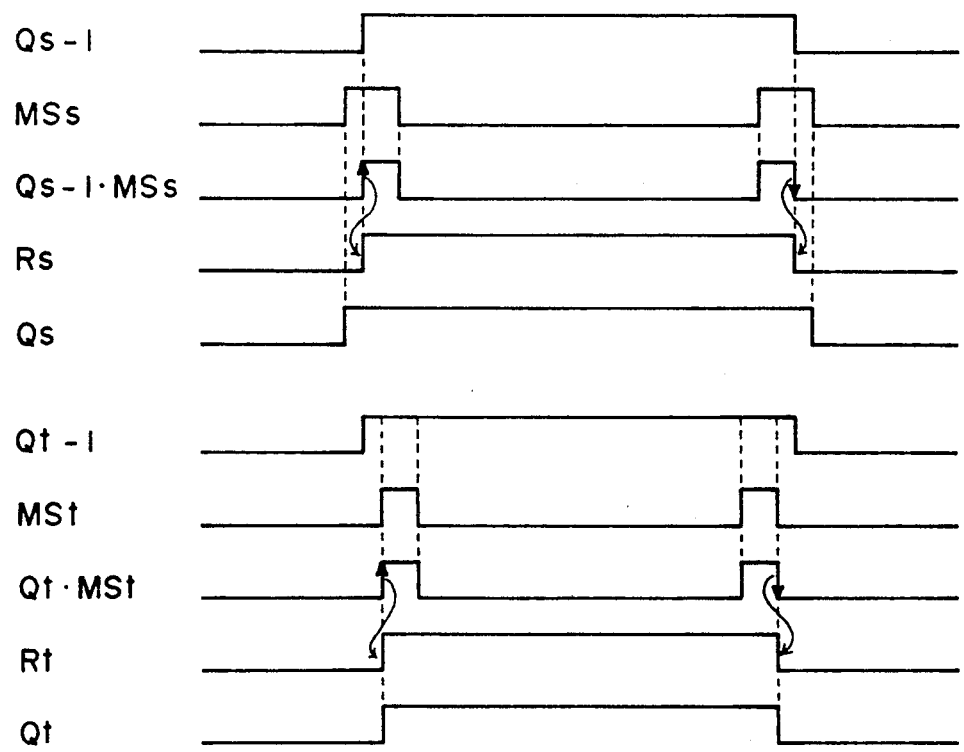

Similarly, the marker signal obtained by scanning like t in FIG. 21 becomes as represented by Mt in FIG. 22. It is pressumed that the region signal obtained represented by by a just preceding scan t−1 (not shown in FIG. 21) is Qt−1×Mt is obtained, and an edge detect pulse Rt is formed from the rising edge to the breaking edge of Qt−1×Mt. Then, an OR signal Qt of the marker signal Mt and the edge detect pulse Rt is formed. The signal Qt is used as a marker region signal Q for the present scanning line t.

The marker region is thus detected. In the next process, the color data of the marker must be sampled.

Figure 23:
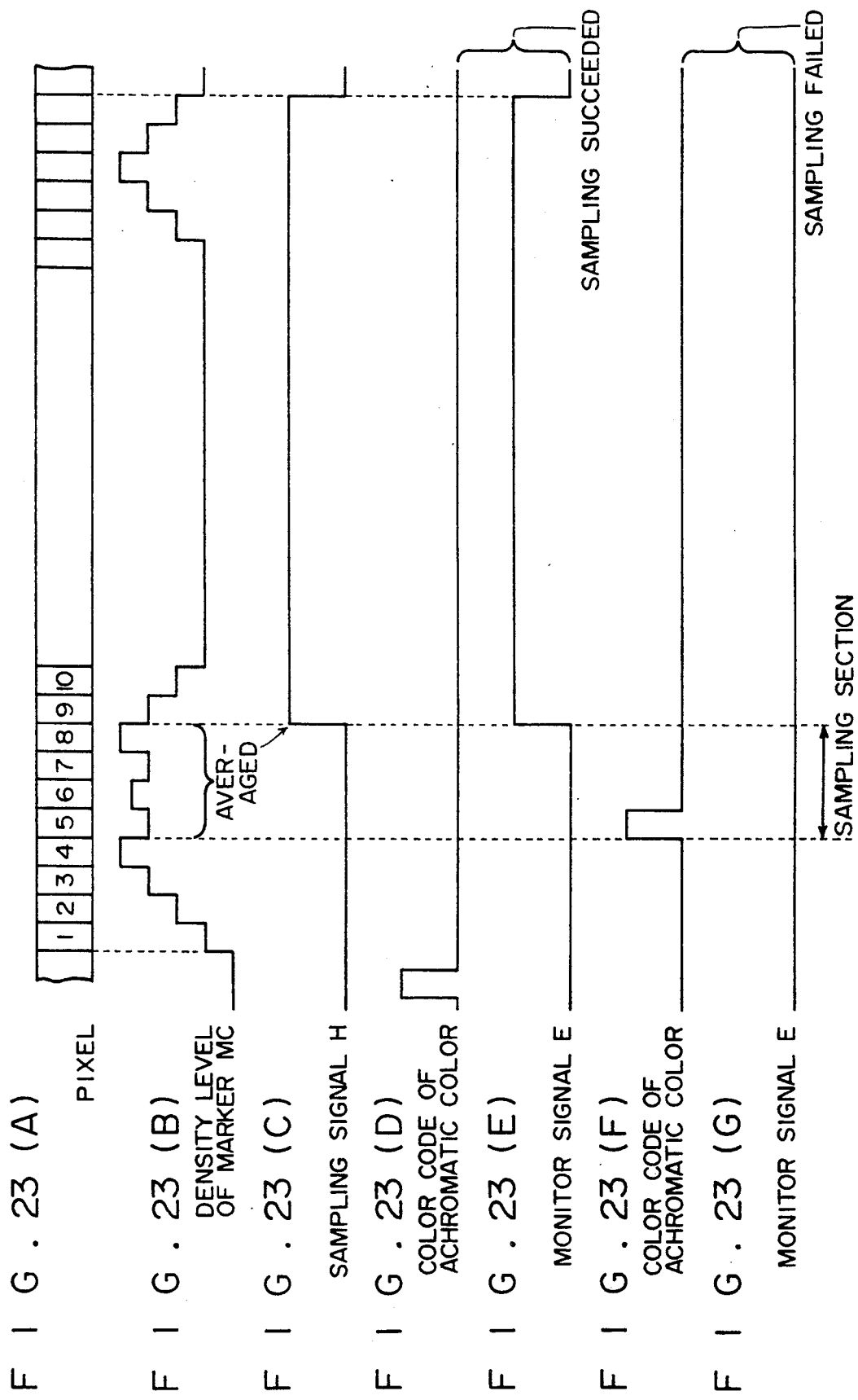
FIGS. 23(A) to 23(G) are diagrams explaining the sampling.

To stabilize the color data in this embodiment, the density levels of four pixels located four pixels inside from the edge of the marker are sampled (FIGS. 23(A), 23(B)), and the average value thereof is used as a sampling signal H (density data) of C, M, Y, K in the marker signal MS (FIG. 23(C)).

The marker sampling monitoring portion 52 of FIG. 15 works as means that handles the sampling processing of the marker color sampling portion 50 as the effective sampling processing when there is no color code of achromatic color in the marker signal MS.

Therefore, the monitor signal E which represents that the sampling processing is effective is produced only when a color code representing an achromatic color exists outside the region of the marker signal MS as shown in FIGS. 23(D) to 23(G).

Next, the marker color density determining portion 60 will be described.

Figure 24:
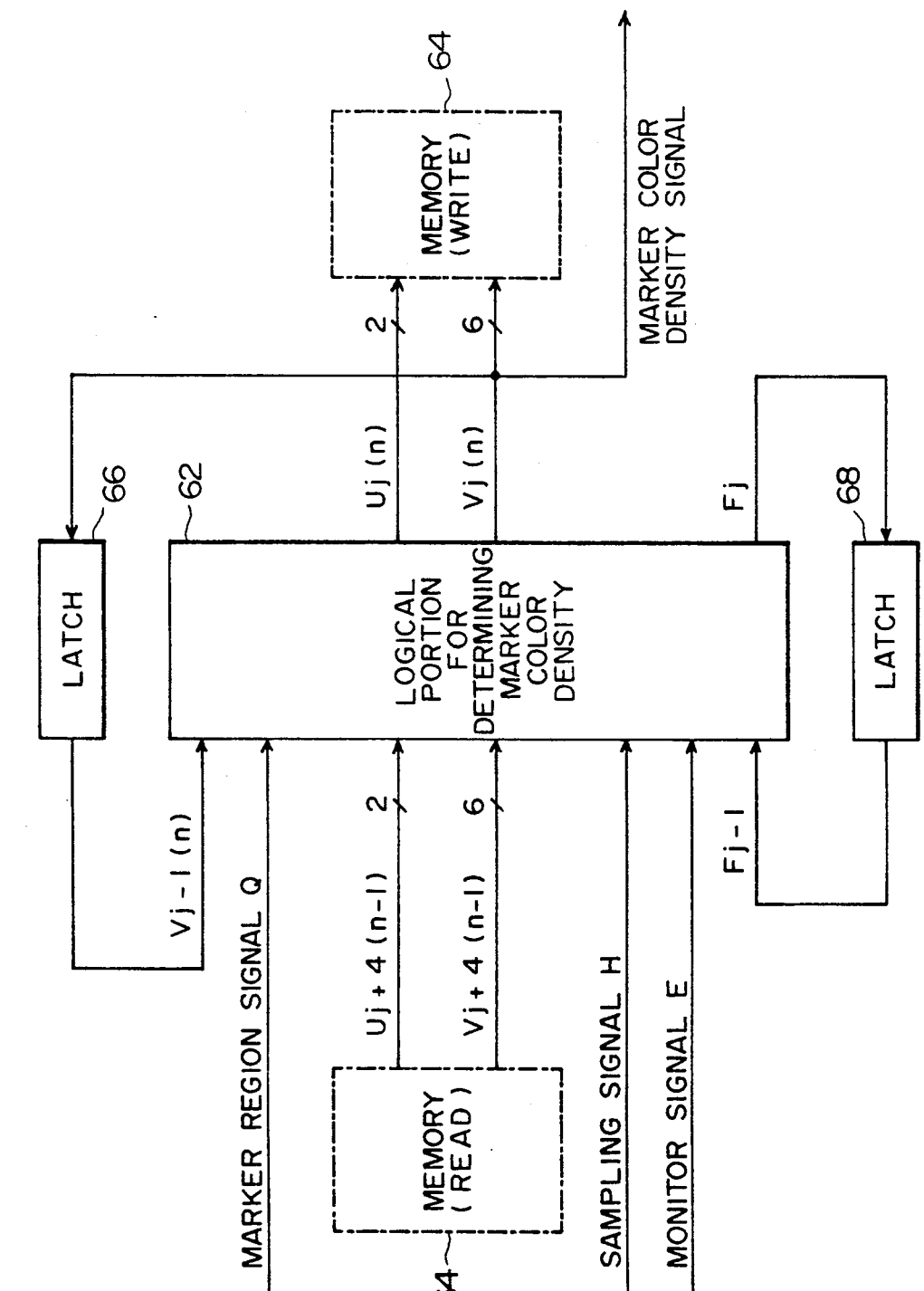
FIG. 24 is a system diagram of a portion for determining marker color density.

This is constituted, as shown in FIG. 24, by a marker color density determining logic portion 62, a memory 64 which performs write and read within a period of one pixel, and a pair of latch circuits 66 and 68.

For easy explanation of the write and read operations of the memory 64, FIG. 24 shows as if there are two memories 64.

Symbol U denotes a content of a 2-bit counter, V denotes density data of a marker color, n denotes a scan line, j denotes a pixel number, and F denotes a flag which indicates whether the density data of the marker color is definite or indefinite.

The marker color density determining logic portion 62 receives:

(1) a marker region signal Q,
(2) a sampling signal H,
(3) a monitor signal E,
(4) a flag F,
(5) a counter output U read from the memory 64, and
(6) density signals V of the present line and one line before read from the memory 64, and produces:
(7) a counter output U of the present line written on the memory 64, and
(8) a density signal V of the present line written on the memory 64.

Next, described below is under what condition the density of the marker MC is specified. In the following example, the data of the third line in the marker region is used as the data of the marker MC.

(I) When Q=0.

In this case, no color conversion processing is necessary outside the marker region and, hence, Uj(n)=0
Vj(n)=0 are written, and there further holds,

Fj=0.

(II) Q=1, Uj+4(n−1)<3, E=1, Fj=0.

For instance, when the first line of the marker MC is scanned and when the sampling becomes effective after the fourth pixel, E=1 is obtained from the ninth pixel. Like, Uj(n)=Uj+4(n−1)+1
Vj(n)=H
Fj=0 therefore, the counter output Uj+4(n−1)+1 which is increased by 1 is stored as the counter output Uj(n) of the present line n, and the density data is stored for the first time. In this case, the density data Vj(n) itself of the sampling signal H is stored.

Figure 25:
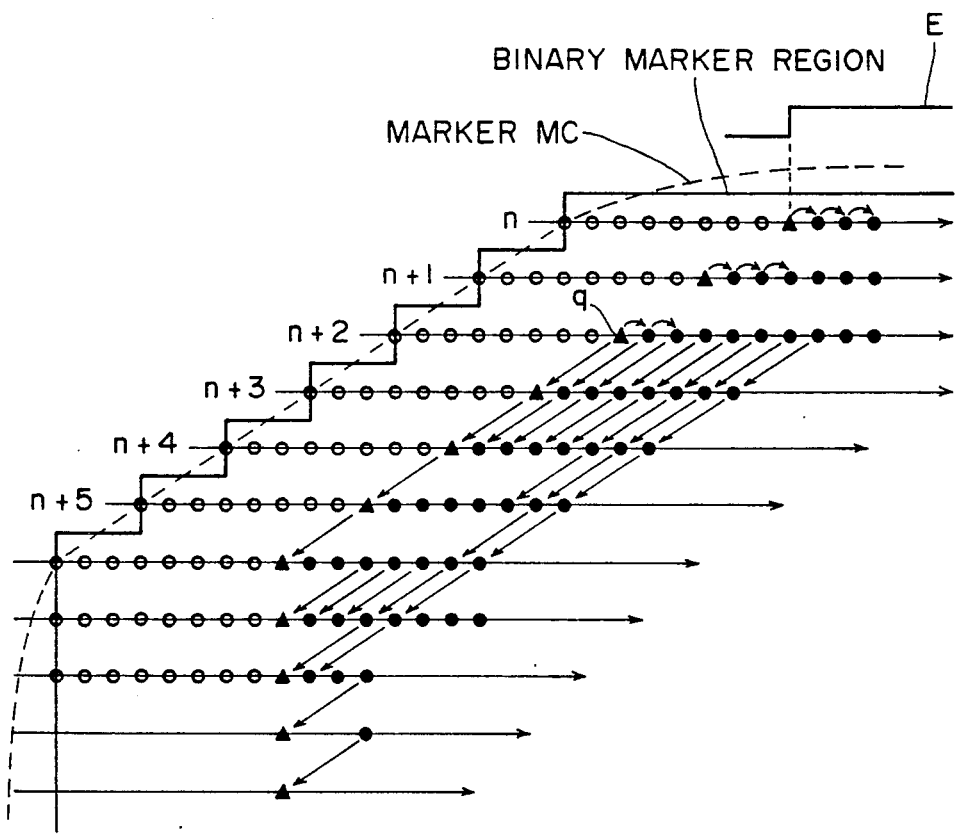
FIGS. 25 to 28 are diagrams explaining how to determine the marker color density.

That is, as shown in FIG. 25, the density data (average value) obtained at the ninth pixel is stored. Here, however, the density data of the marker MC has not yet been determined since the density data of the third line is used.

In FIG. 25, open circles represent pixels on each of the lines. Among them, pixels designated by triangles are the ninth ones on each of the lines. Black marks indicate that they are used as density data.

(III) Q=1, Uj+4(n−1)<3, E=0 or 1, Fj=1.

At the tenth pixel on the same line n, the data of one pixel before is stored. That is, Uj(n)=Uj+4(n−1)+1
Vj(n)=Vj−1(n)
Fj=1

As shown in FIG. 25, therefore, the density data of the ninth pixel is stored. This operation is continued for the same line n until the marker region is exceeded. Therefore, the density data at the ninth pixel are successively propagated in the scanning direction.

Until the fourth scanning line is reached, the density data (sampling signal H) of the ninth pixel on the same scanning line is stored as the density data Vj(n) of the line under the aforementioned conditions (II) and (III).

(IV) Q=1, Uj+4(n−1)=3, E=1.

At the (n+3)th line, i.e., at the fourth line, the density data of a pixel positioned four pixels after the pixel located at the same position in the previous line is stored as the density data of the present line. Therefore, Uj(n)=Uj+4(n−1)(=3)
Vj(n)=Vj+4(n−1)
Fj=1

In the case of FIG. 25, the density data four pixels after the pixel located at the same position in the previous line is the density data at the ninth pixel on the (n+2)th line.

As for the tenth and subsequent pixels on the same line n, the density data Vj(n)=Vj+4(n−1) are stored under the condition (IV).

Figure 26:
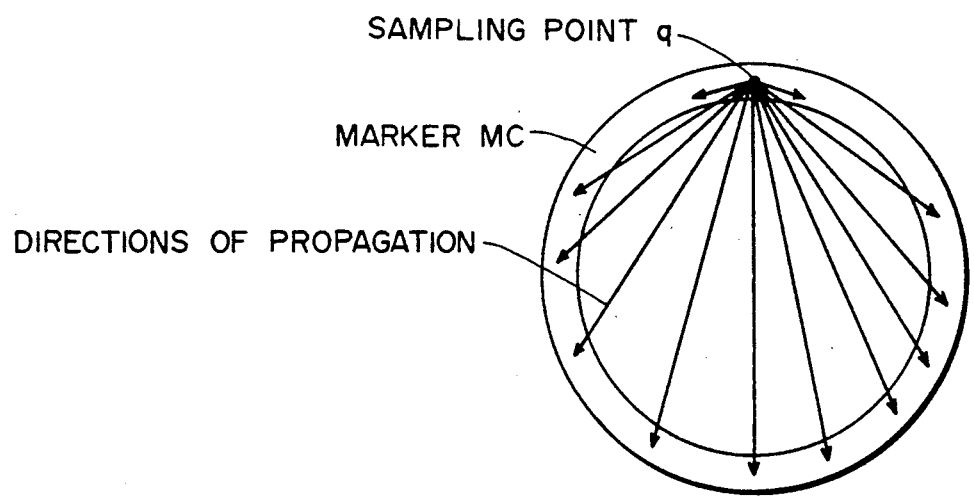
Figure 27:
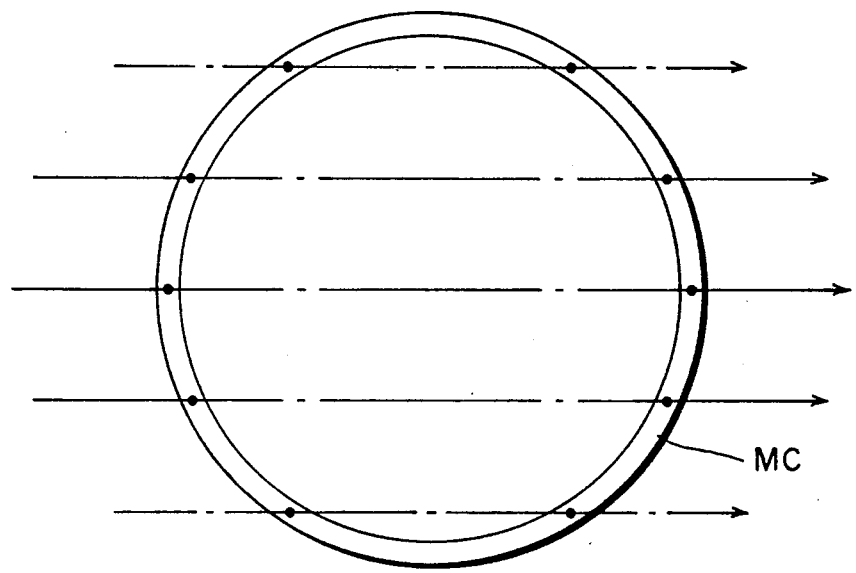
Figure 28:
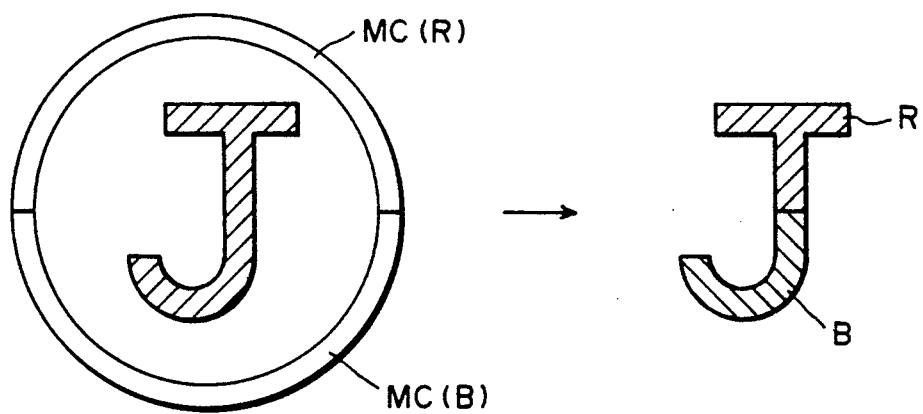

The same operation is carried out for the (n +4)th and subsequent lines until the end of the marker MC. As shown in FIG. 26, therefore, the density data of a sampling point q sampled on the third line is propagated in the directions of scanning lines. Therefore, the density data of the third line is used as the density data of the marker MC.

Then, the density of the marker MC becomes definite on the third line and is not affected by a change in color or density of the marker MC.

(V) Q=1, Uj+4(n−1)<0.3, E=0, Fj=0.

When the sampling is not effective and the flag F is not determined up to the third line (though such happens very scarcely), i.e., when E=0 and Fj=0, the density data of the previous line is stored under the following conditions, Uj(n)=Uj+4(n−1)
Vj(n)=Vj+4(n−1)
Fj=0

In the foregoing description, the present invention was adapted to the color reproducing machine. However, it needs not be pointed out that the color processing apparatus of the present invention can be used for a variety kinds of equipment that process color images.

Effects of the Invention

According to the present invention as described above, the coordinate system of R, G, B, C, M, Y and BK is divided into a plurality of regions, masking coefficients are calculated for each of them and are selected depending upon the input R, G and B signals, in order to convert the input R, G and B signals into C, M and Y signals. Very small conversion error is invited by the linear masking method, and color reproduceability is improved compared with the prior art. According to the present invention, furthermore, the marker color and the density data are determined using a particular line, and are used as the color and density data of the marker region. Therefore, the image in the region surrounded by the marker is not recorded in plural colors. Further, the image recorded in the marker color does not develop density shading, contributing to improving the quality of the recorded image.

What is claimed is:

1. A color image processing apparatus, comprising:
   image reading means for reading a document image of a document and for separating the document image into three color separated images; and
   color reproducing means for converting the color separated images into density data that correspond to a recording color,
   wherein the color reproducing means includes means for storing plural sets of matrix coefficients corresponding to a plurality of linear maskings, means for selecting one of the sets of matrix coefficients corresponding to one of the linear maskings based on the three color separated images, and means for using the selected set of matrix coefficients, and
   wherein the color reproducing means further comprises means for determining whether a pixel is white, black or chromatic, and wherein the matrix coefficient selecting means includes means for selecting coefficients for a chromatic pixel based upon which of six regions on a L*a*b* isochromatic coordinate system the pixel color falls.

2. A color image processing apparatus, comprising:
   image reading means for reading, in a scanning direction, a document image of a document at each of a plurality of scanning lines, and for separating the document image into three color document images, the scanning direction being perpendicular to a direction of the scanning lines;
   color code forming means for forming color codes indicating whether each pixel that is read is white, black or chromatic, based on the color separated images;
   color reproducing means for converting the color separated images into density data corresponding to each of a plurality of recording colors;
   marker region detecting means for detecting a marker portion on the document image based on the color codes from the color code forming means, and for determining a marker region surrounded by the marker portion; and
   marker color conversion means for converting the density data on a first scanning line within the marker region into the density data of the marker portion at a sampling point on a particular scanning line in the marker portion, and for converting the density data on a second scanning line successive to the first scanning line within the marker region into the converted density data on the first scanning line.

3. The color image processing apparatus, as claimed in claim 2, wherein the marker region detecting means includes means for correcting blur and cut occurring in the marker portion on the document image that is read.

4. A color image processing apparatus, comprising:
   image reading means for reading, in a scanning direction, a document image of a document at each of a plurality of scanning lines, and dividing the document image into three color separated images, the scanning direction being perpendicular to a direction of the scanning lines;
   color reproducing means for converting the color separated images into density data corresponding to each of a plurality of recording colors;
   marker region detecting means for detecting a marker portion on the document image, and for determining a marker region surrounded by the marker portion;
   sampling means for sampling the density data on a particular line in the marker portion and for determining density data of the marker portion based on the sampled density data; and marker color conversion means for converting the density data on a first scanning line within the marker region into the determined density data of the marker portion from the sampling means, and for converting the density data on a second scanning line successive to the first scanning line within the marker region into the converted density data on the first scanning line.

5. The color image processing apparatus, as claimed in claim 4, wherein the sampling means samples a plurality of the density data at sampling points on the particular scanning line in the marker portion, corresponding to a predetermined number of pixels, and for determining the density data of the marker portion based on the sampled density data to be used by the marker color conversion means.

6. The color image processing apparatus, as claimed in claim 4, wherein the marker color conversion means includes means for converting the density data of at least an achromatic image located inside the marker region into the density data of the marker portion.

7. The color image processing apparatus, as claimed in claim 4, wherein the plurality of recording colors are yellow, magenta, cyan, and black.

8. The color image processing apparatus, as claimed in claim 4, wherein the marker color conversion means converts the density data of the document image at a first pixel on the second scanning line into the converted density data at a second pixel on the first scanning line, a position of the second pixel corresponds to a position of a pixel located a number of predetermined pixels after the first pixel in the direction of the scanning line.

* * * * *

UNITED STATES PATENT AND TRADEMARK OFFICE
CERTIFICATE OF CORRECTION

PATENT NO. :   5,220,416
DATED      :   June 15, 1993
INVENTOR(S) :  Takashi HASEBE et al.

It is certified that error appears in the above-indentified patent and that said Letters Patent is hereby corrected as shown below:

Claim 2, column 16, line 22, "document" (second occurrence) should read --separated--.

Signed and Sealed this

Fifth Day of April, 1994

*Attest:*

BRUCE LEHMAN

*Attesting Officer*   *Commissioner of Patents and Trademarks*